(12) United States Patent
Podbielski et al.

(10) Patent No.: US 7,891,931 B2
(45) Date of Patent: Feb. 22, 2011

(54) LATERAL GUIDANCE TRANSPORTATION SYSTEM

(75) Inventors: Leobald Podbielski, Karlsruhe (DE); Udo Laubenstein, Stutensee (DE); Josef Schmidt, Graben-Neudorf (DE); Bernhard Schneider, Oberhausen-Rheinhausen (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 1178 days.

(21) Appl. No.: 10/562,783

(22) PCT Filed: May 19, 2004

(86) PCT No.: PCT/EP2004/005370
§ 371 (c)(1),
(2), (4) Date: Dec. 28, 2005

(87) PCT Pub. No.: WO2005/002998
PCT Pub. Date: Jan. 13, 2005

(65) Prior Publication Data
US 2007/0073479 A1 Mar. 29, 2007

(30) Foreign Application Priority Data
Jul. 1, 2003 (DE) ................................ 103 29 776

(51) Int. Cl.
*B66F 9/24* (2006.01)
(52) U.S. Cl. ........................... 414/663; 701/19; 701/22; 414/281; 191/10
(58) Field of Classification Search ................. 104/288, 104/48, 50; 191/10; 701/19, 22, 50, 210; 414/631, 663, 279, 281, 282, 630; 361/159; 307/104; 700/213, 214, 217, 228
See application file for complete search history.

(56) References Cited

U.S. PATENT DOCUMENTS 3,800,963 A * 4/1974 Holland ...................... 414/279

(Continued)

FOREIGN PATENT DOCUMENTS

DE 33 42 184 3/1985

(Continued)

OTHER PUBLICATIONS

Translation of International Preliminary Report on Patentability from International Application No. PCT/EP04/005370, dated Aug. 3, 2006.

(Continued)

*Primary Examiner*—Khoi Tran
*Assistant Examiner*—Spencer Patton
(74) *Attorney, Agent, or Firm*—Kenyon & Kenyon LLP (57) ABSTRACT

Lateral guidance transportation systems include at least one route, on which at least one transportation vehicle is guided as the main vehicle. The main vehicle is energized by a primary circuit having a contact wire arranged along the route, or contactlessly. The main vehicle includes a lifting platform that is drivable by a drive, and on which there is at least one satellite vehicle. The satellite vehicle also includes a drive for automatically moving along an additional route, and which is arranged for transporting goods. The additional route includes a satellite route section for the positioning and parking of the satellite vehicle. The satellite route section is truly alignable, by positioning the main vehicle on satellite routes arranged transversely to the route, on shelves. Satellite route sections and satellite routes include primary conductors energized contactlessly by the main vehicle.

14 Claims, 5 Drawing Sheets

U.S. PATENT DOCUMENTS

| | | | |
|---|---|---|---|
| 3,881,581 A * | 5/1975 | Richardson | 191/2 |
| 4,833,337 A * | 5/1989 | Kelley et al. | 307/11 |
| 5,519,262 A * | 5/1996 | Wood | 307/104 |
| 6,089,512 A * | 7/2000 | Ansorge et al. | 246/194 |
| 6,148,752 A * | 11/2000 | Upmeyer | 114/72 |
| 6,213,025 B1 * | 4/2001 | Sauerwein et al. | 104/121 |
| 6,462,432 B1 | 10/2002 | Seelig et al. | |
| 6,583,697 B2 * | 6/2003 | Koyama et al. | 336/83 |
| 2001/0006364 A1 * | 7/2001 | Lin et al. | 336/200 |
| 2004/0051628 A1 | 3/2004 | Uhl | |

FOREIGN PATENT DOCUMENTS

| | | |
|---|---|---|
| DE | 92 10 587 | 1/1994 |
| DE | 92 08 348 | 9/1994 |
| DE | 196 26 966 | 1/1998 |
| DE | 197 35 624 | 12/1998 |
| DE | 198 49 276 | 5/2000 |
| DE | 100 53 373 | 5/2002 |
| EP | 1 231 163 | 8/2002 |

OTHER PUBLICATIONS

International Search Report from International Application No. PCT/EP04/005370, dated Oct. 7, 2004.

Translation of Written Opinion of ISA from International Application No. PCT/EP04/005370, dated Oct. 7, 2004.

* cited by examiner

LATERAL GUIDANCE TRANSPORTATION SYSTEM

FIELD OF THE INVENTION

The present invention relates to a lateral-guidance transportation system.

BACKGROUND INFORMATION

German Published Patent Application No. 197 35 624 describes a method for the non-contact transmission of electric power from a medium-frequency current source having a medium frequency $f_M$ to one or more moving consumers via a transfer line, and from the pick-ups, allocated to the moving consumers, having a downstream mobile converter for adjusting the power received from the transfer line, the transfer line being fed by the medium-frequency current source with a medium-frequency current that is constant in its effective value during the power transmission.

The mobile converter converts the medium-frequency current, injected from the pick-up, into a DC voltage. As described in FIGS. 3, 7a and 7b and the associated specification of German Published Patent Application No. 197 35 624, switch $T_s$ is operated synchronously with respect to the characteristic, and with double the frequency of the input current of the mobile converter. However, an important disadvantage is that this high switching frequency $2\,f_M$ results in high switching losses. Another disadvantage is that the synchronous principle can no longer be maintained when using a plurality of asynchronously operating power supplies for supplying a mobile converter.

A method is described in German Published Patent Application No. 100 53 373 which, by contrast to German Published Patent Application No. 197 35 624 is operated asynchronously, and has lower switching losses.

A conveyor device is described in German Published Patent Application No. 33 42 184 that includes guide rails and is curve-negotiating with positive steering.

German Published Patent Application No. 198 49 276 describes a method for traveling along a line using a curve-negotiating storage and retrieval vehicle for a high-bay warehouse. Such systems are supplied using a contact wire that does not operate free from wear.

In the flyer of the firm SEW-EURODRIVE GmbH & Co. KG, "Product Announcement MOVITRANS" system components are described, the transmission head being designated as a pick-up, and being connected to a mobile converter, which makes available a supply voltage for a load.

In German Published Patent Application No. 196 26 966, a transport system having satellite vehicles is described, in which the main vehicle is supplied with energy in a contactless or non-contact manner. In addition, satellite vehicles are also supplied with energy in a contactless manner. It is a disadvantage that a satellite vehicle has a great overall height because of the space requirement of the U-shaped pick-ups. In addition, both in the main aisle and in the side aisles or shelf areas, primary circuits, that is, for example, line conductors, are laid out, which have constantly to be provided with current. Consequently, radiation losses may be great.

In the prospectus Planar E-Kerne for SMPS, that is, switching power parts, of the firm Kaschke KG from the year 2003, E-shaped planar cores are described.

An example embodiment of the present invention may provide a storage and retrieval or shelf warehouse and an appertaining storage and retrieval operating unit for a high-bay warehouse that may be executed in a cost-effective and a compact manner.

The transportation system may include at least one route made up of carrier and lateral guidance elements, on which at least one transportation vehicle is guided as the main vehicle, which has a device for automatically moving away along the route, and to which energy is transmitted by a primary circuit having a contact wire arranged along the route, or in a contactless manner. The main vehicle includes a lifting platform that is able to be driven by a drive, especially, for example, an electric motor or a geared motor, and on which there is at least one satellite vehicle that is also includes a drive, such as, for example, an electric motor or a geared motor, for automatically moving away along an additional route, and which is developed for transporting goods. The route includes a satellite route section for the positioning and parking of the satellite vehicle. The satellite route section is truly alignable, by positioning of the main vehicle along its route, on satellite routes situated transversely to the latter, these satellite routes being situated on shelves. Satellite route sections and satellite routes include primary conductors which are supplied with energy in a contactless manner from the main vehicle.

Less cabling is required, the radiation may be lowered, and the expenditure of distribution boxes and appertaining electrical and electronic components and costs may be diminished. Besides that, the transportation system may be implemented in a compact manner.

The drive of the lifting platform may be supplied with energy in a contactless manner. In particular, the drive of the satellite vehicle is supplied with energy in a contactless manner. It may be provided that the wear and the maintenance expenditure may be lowered.

Energy may be transferable at one place in a contactless manner by the main vehicle to at least one primary conductor of at least one shelf of at least one side aisle. It may be provided that only that shelf, or those shelves, are supplied with current, in which the satellite vehicle is located. Other primary lines may not have to be supplied with current. Consequently, no electrical distribution devices may be necessary. In addition, the radiation and the costs may be able to be lowered.

At least one pick-up may be provided for the contactless energy transfer. It may be provided that it is implementable compactly and/or having a high efficiency.

The main vehicle may include a power supply unit that feeds a primary line, provided on the main vehicle, which is inductively coupled to a pick-up which is connected to a terminal box for impedance compensation, and which feeds at least one primary line provided in the satellite route section. Depending on the application, the impedance may be adjustable.

The main vehicle may include a primary line which may, during the aligning, be inductively coupled to a pick-up, arranged in the floor, which is connected, for impedance compensation, via a terminal box, to at least one primary line provided in a shelf. This may provide that the position of the main vehicle controls the supplying of current to the primary conductors of the shelves. Consequently, no further distribution devices may be necessary.

The lifting platform may include a primary line, e.g., a pick-up provided as a primary line, which, when there is aligning orientation of the main vehicle and the vertical positioning of the lifting platform, is able to be inductively coupled to a pick-up, provided at the shelf, which is connected via a terminal box to at least one primary line provided in a shelf, for impedance compensation. In particular, the supplying with current of the primary conductor of the respective shelf takes place from the main vehicle. This may provide that the positioning of the main vehicle and of the lifting platform controls the supplying of current to the primary conductor of the shelves.

At least one pick-up may have a U-shaped or a C-shaped or an E-shaped ferrite core. This may provide that a high degree of efficiency is attainable.

At least one pick-up may include a winding executed as a flat winding. This may provide that a very compact development may be attained for the shelf warehouse including main vehicle and satellite vehicle.

The flat winding may be positioned around the middle leg of an E-shaped core. This may provide that, in spite of the flat winding, high efficiency is attainable in the contactless energy transmission.

The legs of the E may be shorter than the distance of the next nearest legs from one another. This may provide that the embodiment is very compact.

The primary line may be executed as an outgoing line and a return line, or as an outgoing line and an at least partially surrounding profile. This may provide that, depending on the application, the system of contactless energy transmission is adjustable.

Further advantages are yielded from the dependent claims.

LIST OF REFERENCE NUMERALS 1 line conductor for side aisle
2 pick-up, flat
3 pick-up, U-shaped
4 power supply unit
5 terminal box
6 vehicle control
7 pick-up, flat
8 main vehicle
9 satellite vehicle
10 main vehicle line conductor, vertical
11 terminal box
12 line conductor, lifting platform
13 line conductor horizontally laid out on the vehicle floor in the main vehicle
14 pick-up, flat
15 pick-up, flat
16 capacitor for compensation
17 matching transformer
18 capacitor for compensation of the line
51 aluminum plate
52 flat winding
53 molding compound
54 planar core Example embodiments of the present invention are explained in greater detail with reference to the appended Figures.

DETAILED DESCRIPTION

Example embodiments of the present invention include systems for contactless energy transmission. In particular, in this context, a pick-up is provided on the movable part, which includes at least one winding. The non-movable part of the system includes, as the primary line, at least one line conductor and one return line. The return line may be implemented either in a profile or as a line conductor. The pick-up is inductively coupled to the line conductor(s). If the return line is arranged as a profile, the pick-up is arranged such that at least its ferrite core surrounds the line-type outgoing line at least partly. Accordingly, the pick-up is U-shaped or C-shaped. The secondary winding, that is, the winding of the pick-up, is arranged around the legs of the U or C. If the return line is arranged as a line conductor, the ferrite core may be arranged as an E-shaped core, the two lines, that is, the outgoing line and the return line, being arranged between the legs of the E, in the leg direction, at a slight distance from this position.

Figure 1:
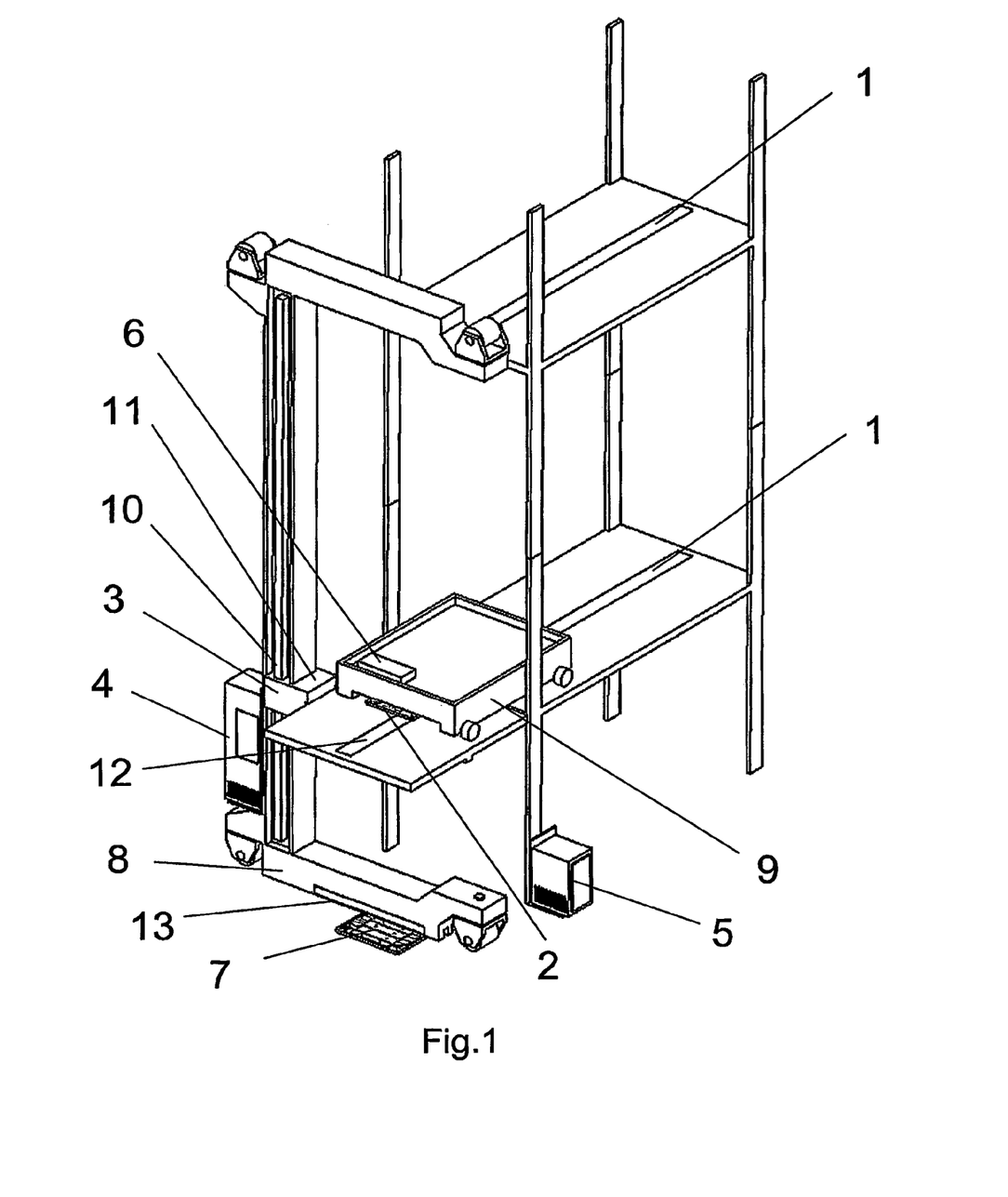
FIG. 1 illustrates a shelf warehouse and a shelf operating unit.

A shelf warehouse or storage and retrieval high-bay warehouse and a shelf operating unit or storage and retrieval unit for a high-bay warehouse are illustrated in FIG. 1.

The shelf operating unit includes a main vehicle 8, on which a satellite vehicle 9 is provided, which is movable by a lifting platform, that is vertically movable by a drive, to a shelf of the shelf warehouse. The shelf warehouse has two shelves as illustrated in FIG. 1.

Figure 2:
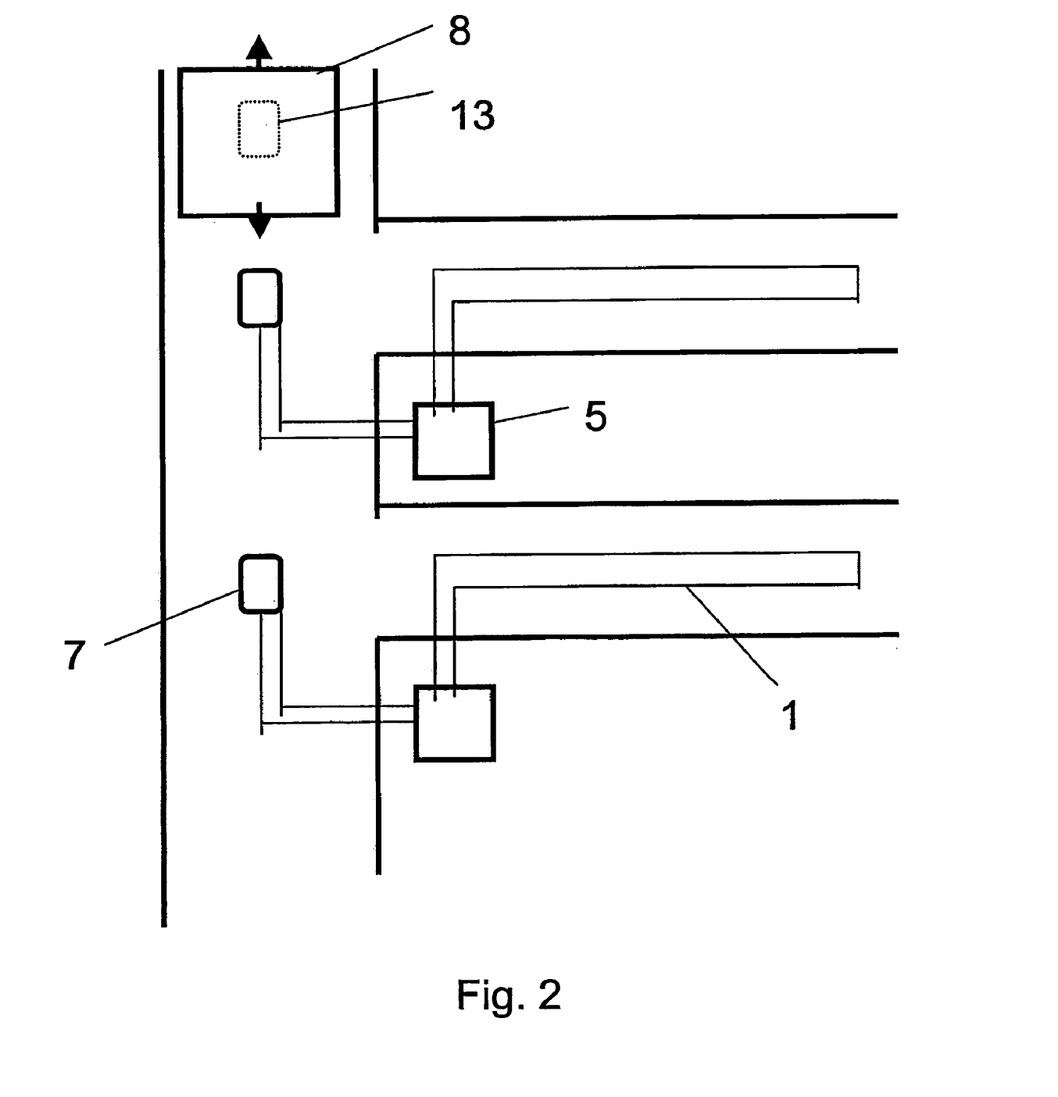
FIG. 2 illustrates side aisles.

The shelves are arranged one over the other in a side aisle. Additional side aisles are illustrated symbolically in FIG. 2. FIG. 2 also illustrates as primary line line conductor 1 arranged in a shelf, having an outgoing and a return line, this primary line being electrically connected to a terminal box 5, which in turn is connected to a flat pick-up 7 that is rigidly positioned in the floor. Terminal box 5 includes an electronics system for impedance matching, which is illustrated in exemplary fashion in FIG. 3, in additional exemplary embodiments similarly constructed circuits, which at least include the functions of FIG. 3, being also possible.

As illustrated in FIG. 1, on the lifting platform a line conductor is provided which, after reaching the correct height of the shelf of the shelf warehouse, is arranged such that line conductor 1 located in the side aisle is in alignment with the line conductor of the lifting platform. Consequently, it is made possible for the satellite vehicle to be supplied with energy in contactless fashion, e.g., during travel of the lifting platform into the shelf and back.

In order to take on energy, satellite vehicle 9 includes a flat pick-up 2. In addition, satellite vehicle 9 includes a vehicle control, which is supplied from pick-up 2 and an electronic circuit, and that is electrically connected with it, that is also designated as mobile converter. The components may also be able to be arranged in integrated fashion, and thus may take up less space. In particular, a housing is providable for the integrated design, and thus the mass may be reduced, which contributes to the dynamic behavior of the vehicle.

The lifting platform is vertically movable and includes a drive for this, which is supplied in contactless fashion from the primary line of the main vehicle. For this, at the lifting platform, a U-shaped pick-up 3 is provided and as primary line, a line conductor 10 is provided at the main vehicle. Consequently, there may be a high efficiency in the energy transmission. The space requirement for the U-shaped pick-up may not interfere, since the contactless energy supply is arranged at the side of the main vehicle, that is, in the direction of motion.

The drive of the main vehicle and at least one power supply unit 4 are electrically supplied using contact wires. Power supply unit 4 supplies vertical line conductor 10 and an additional line conductor 13, which is arranged horizontally on the vehicle floor of the main vehicle. This additional line conductor 13 is also supplied by power supply unit 4, and is arranged so that, during positioning of line conductor 12 of the main vehicle in alignment with line conductor 1 of the side aisle, line conductor 13 is positioned over a flat pick-up 7, that is arranged in the floor. Thus, energy is transferable to this flat pick-up 7 by line conductor 13. Flat pick-up 7 is connected electrically to terminal box 5, which is provided for distributing to line conductors 1 of the shelves.

The satellite vehicle includes at least one flat pick-up 2, for taking on energy, which is coupled to the line conductor of the lifting platform or the shelf. Since the power supply unit supplies both line conductors either directly or indirectly, no substantial fluctuation in the energy supply may be noticeable when the satellite vehicle travels out of the lifting platform.

Satellite vehicle 9 may include several flat pick-ups for picking up energy. Consequently, depending on requirement, more energy is transferable to the movable vehicle part.

Figure 4:
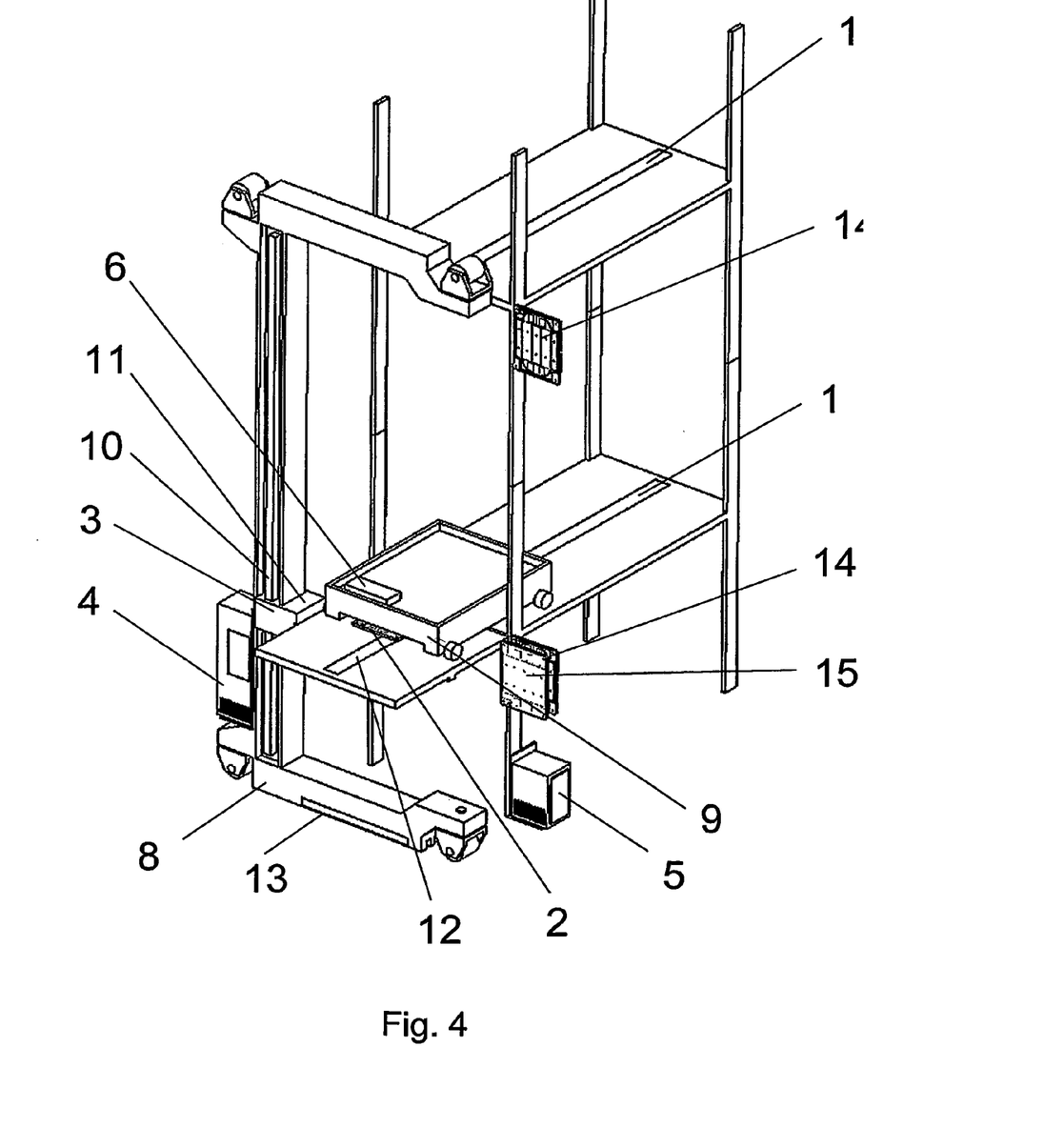
FIG. 4 illustrates an example embodiment of the present invention.

As illustrated in FIG. 4, a flat pick-up 15 may be affixed to the lifting platform, which, upon in-alignment positioning of line conductor 12 of the route of the satellite vehicle of the lifting platform and of line conductor 1 of the shelf, is also positioned aligned in front of a flat pick-up 14 that is firmly connected to the shelf, which is in electrical contact with line conductor 1 of the shelf and supplies or powers it. Consequently, only respectively required line conductor 1 of the respective shelf is supplied with current, and as little energy as possible may be lost.

The lifting platform includes terminal box 11, which is electrically connected to U-shaped pick-up 3, and supplies line conductor 12 of the lifting platform. As illustrated in FIG. 4, terminal box 11 also supplies flat pick-up 15, that is affixed to the lifting platform, and that supplies the respective flat pick-up 14 in the in-alignment positioning.

Figure 3:
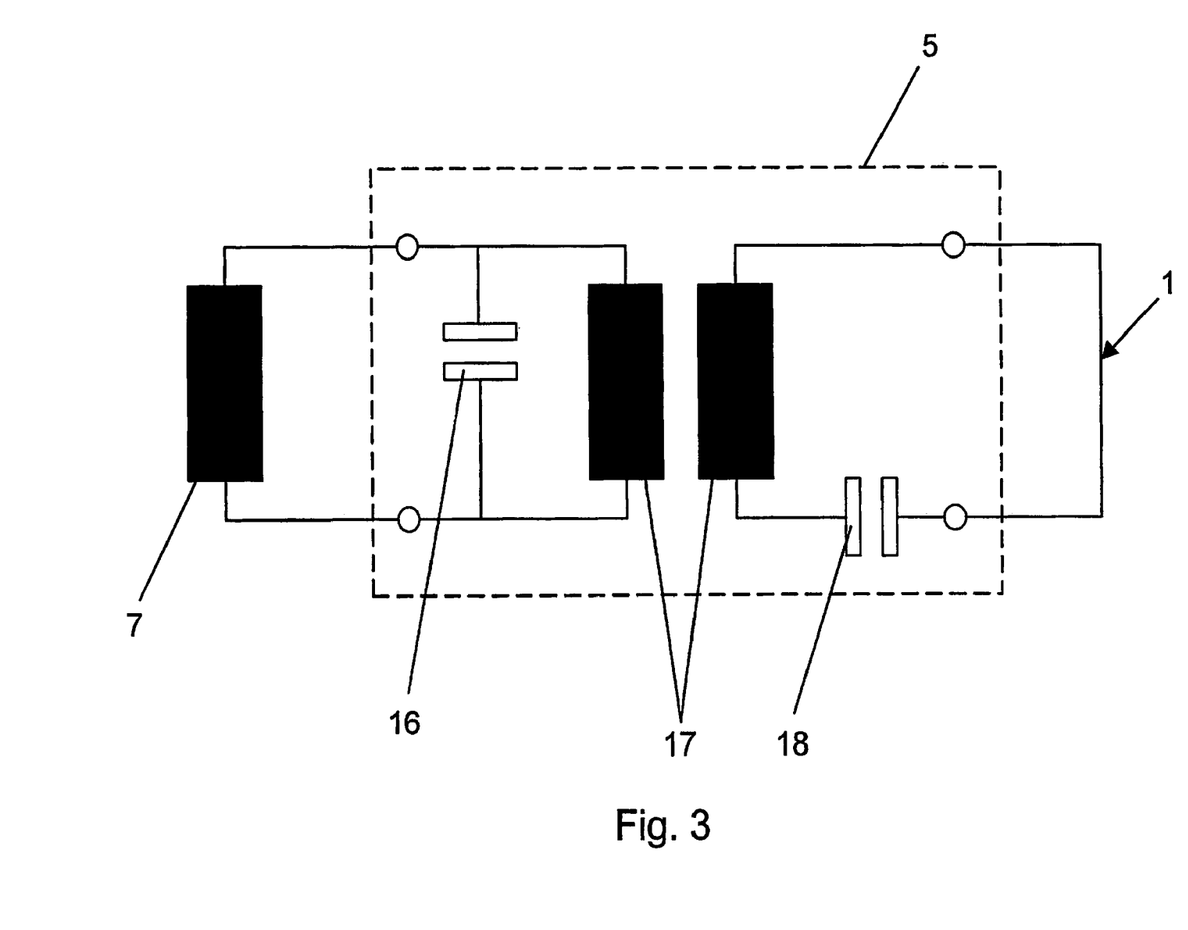
FIG. 3 illustrates a circuit diagram of a terminal box.

FIG. 3 is a circuit diagram of terminal box 5. In this context, secondary winding 7 of flat pick-up 7 illustrated in FIG. 1, that is arranged in the floor, is connected via a capacitor 16 to the primary winding of matching transformer 17 for the compensation of pick-up inductance 7. The latter's secondary winding is connected via a capacitor 18, for the compensation of the route, that is, of line conductor 1, in series with line conductor 1 as primary conductor. Consequently, the impedances may be optimized using capacitors 16 and 18, and using matching transformer 17.

Instead of the supply of the main vehicle using a contact wire, supply using a system of contactless energy transmission possible. Thus, wear and maintenance costs may be able to be further reduced.

Instead of two shelves, a plurality is possible, and instead of one lifting platform, a plurality, and instead of one satellite vehicle, a plurality of these too.

Instead of flat pick-ups, U-shaped and C-shaped pick-ups may also be used.

Example embodiments of the present invention not only relate to shelf operating units but also to other lateral-guidance transportation systems having at least one route made up of carrier elements and lateral-guidance elements on which at least one transportation vehicle is guided as the main vehicle that has device(s) for automatic movement along the route, and to which energy is transferred in a contactless manner from a primary circuit arranged along the route, the main vehicle including a lifting platform which is able to be driven by a drive, such as an electric motor or a geared motor, and on which there is located at least one satellite vehicle, which also includes a drive, such as an electric motor or a geared motor for the automatic movement along an additional route, and is arranged for the transportation of goods. In this context, the route of the satellite vehicle is formed of a first part, that belongs to the lifting platform, and may be designated as a satellite route section, and at least one further part that belongs to a shelf, etc., and is designated as a satellite route. In this context, in the route of the satellite vehicle, on the one hand, that is, in the part located on the lifting platform, and on the other hand, in the part located on the shelf, a primary conductor, such as a line conductor or a primary winding is provided.

The satellite vehicle includes a pick-up that is coupled to the primary conductor, and consequently makes possible a contactless energy transmission. The lifting platform includes a pick-up that is inductively coupled to a primary conductor, such as a line conductor or a primary winding, and consequently the lifting platform is also able to be supplied with energy in a contactless manner. The pick-up may be either U-shaped or, e.g., flat. In the flat arrangement, the pick-up includes a flat winding that is positioned around the middle leg of an E-shaped core. The legs of the E, in this context, may be made short, because the flat winding has only a small height in the direction of the leg of the E. In this context, the primary line is arranged as an outgoing line and a return line.

The supply of current to the primary line of the respective shelf may take place from the main vehicle, and therefore wiring expenditure may be able to be saved. Besides, no costly energy distribution may need to be provided, using distributors or even controllable distribution boxes. In a shelf warehouse having many shelves, therefore, the savings in expenditures and costs may be very great.

The primary line is arranged as a long extended conductor device. Power supply unit 4 is arranged as a medium frequency source for supplying the connected primary lines.

Figure 5:
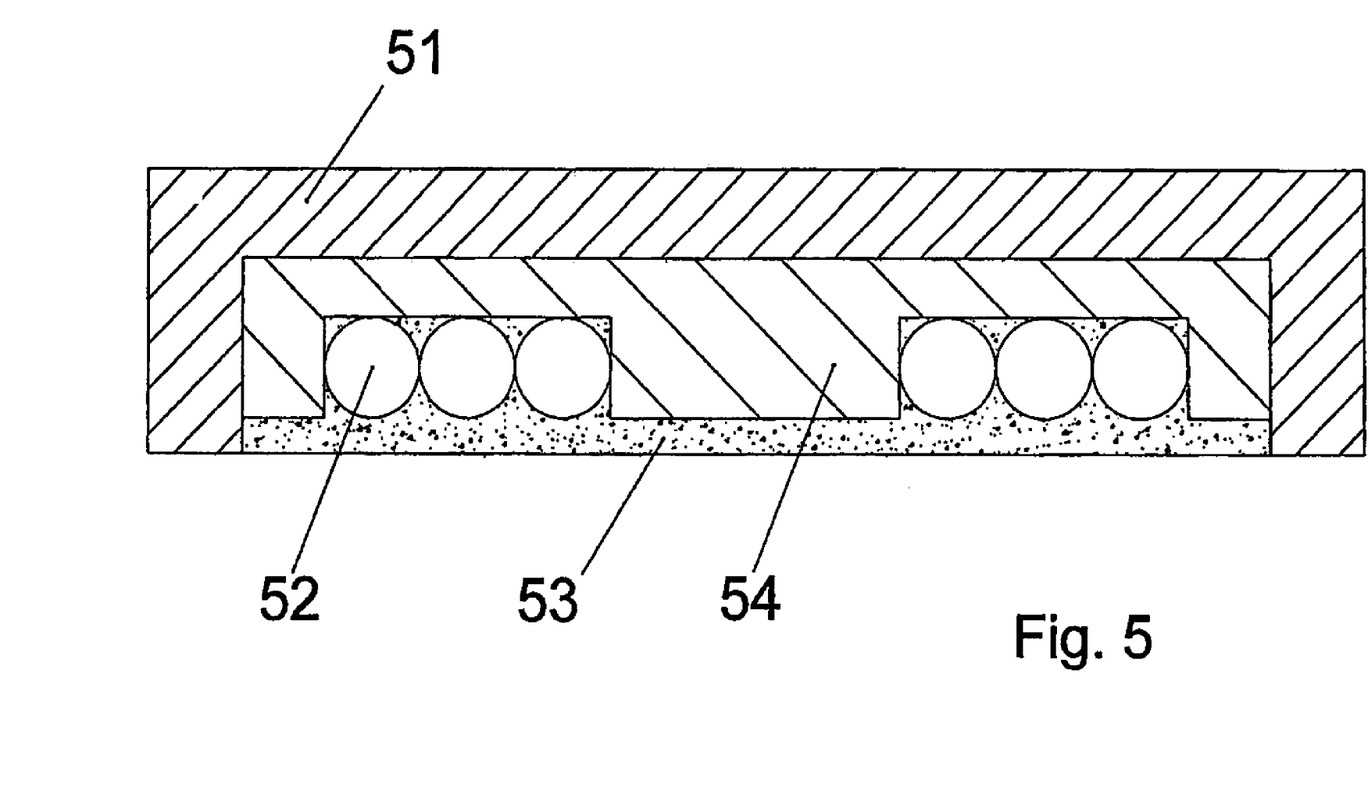
FIG. 5 is a cross-sectional view of flat pick-ups.

FIG. 5 schematically illustrates an exemplary flat pick-up 2, 7, 14 in cross-section. An E-shaped planar core 54 is wound with a single layer flat winding 52, which is encapsulated in an encapsulation compound 53. The E-shaped planar core is partially surrounded by an aluminum plate 51. Instead of single layer flat windings, multilayer ones may also be provided.

Similarly acting pick-ups may also be used, which are not arranged exactly the same, but similarly.

What is claimed is:

1. A lateral guidance transportation system, comprising:
at least one route including carrier elements and lateral guidance elements; and
at least one transportation vehicle arranged as a main vehicle and including a device adapted to automatically move the transportation vehicle along the at least one route, energy transferred to the transportation vehicle one of (a) by a primary circuit having a contact wire arranged along the at least one route and (b) in a contactless manner, the transportation vehicle including a lifting platform driven by a drive, the drive provided with energy in a contactless manner from a primary line arranged vertically at a side of the main vehicle, the transportation vehicle including at least one satellite vehicle including a drive automatically movable along an additional route and adapted to transport goods;

wherein the additional route includes a satellite route section provided on the lifting platform for positioning and parking of the satellite vehicle on the lifting platform;

wherein the satellite route section is alignable by positioning the main vehicle on satellite routes arranged transversely to a main vehicle route, the satellite routes arranged on shelves; and wherein the satellite route section and the satellite routes include primary conductors supplied with energy in a contactless manner from the main vehicle.

2. The transportation system according to claim 1, wherein the drive of the satellite vehicle is supplied with energy in a contactless manner.

3. The transportation system according to claim 1, wherein energy is transferable at at least one place in a contactless manner by the main vehicle to at least one primary conductor of at least one shelf of at least one side aisle.

4. The transportation system according to claim 1, further comprising at least one pick-up adapted to contactlessly transmit energy.

5. The transportation system according to claim 1, further comprising at least one pick-up, wherein the at least one pick-up includes one of (a) a U-shaped ferrite core, (b) a C-shaped ferrite core and (c) an E-shaped ferrite core.

6. The transportation system according to claim 1, further comprising at least one pick-up, wherein the at least one pick-up includes a flat winding.

7. The transportation system according to claim 1, further comprising at least one pick-up, wherein the at least one pick-up includes a flat winding arranged around a middle leg of an E-shaped ferrite core.

8. The transportation system according to claim 5, wherein the at least one pick-up has the E-shaped ferrite core, the legs of the E-shaped ferrite core are shorter than a distance of next nearest legs from one another.

9. The transportation system according to claim 1, wherein the main vehicle includes a power supply unit adapted to feed a primary line provided on the main vehicle inductively coupled to a pick-up connected to a terminal box adapted for impedance compensation and which feeds at least one primary line provided in the satellite route section.

10. The transportation system according to claim 1, wherein the main vehicle includes a primary line inductively coupleable, during alignment, to a pick-up arranged in a floor connected, for impedance compensation, via a terminal box, to at least one primary line arranged in a shelf.

11. The transportation system according to claim 1, wherein the lifting platform includes a primary line inductively coupleable, during an aligning orientation of the main vehicle and a vertical positioning of the lifting platform, to a pick-up provided at the shelf, which is connected via a terminal box to at least one primary line provided in a shelf, for impedance compensation.

12. The transportation system according to claim 1, wherein the main vehicle is adapted to supply current to the primary conductor of the respective shelf.

13. The transportation system according to claim 1, wherein the primary conductors are arranged one of (a) as an outgoing line and a return line and (b) as an outgoing line and an at least partially surrounding profile.

14. The transportation system according to claim 1, wherein at least one of the drives includes at least one of (a) an electric motor and (b) a geared motor.

* * * * *